United States Patent [19]

Go

[11] Patent Number: 4,489,037
[45] Date of Patent: Dec. 18, 1984

[54] APPARATUS FOR AUTOMATICALLY ADJUSTING CHANNEL BOX FITTING POSITION RELATIVE TO NUCLEAR FUEL ASSEMBLY

[75] Inventor: Seitaro Go, Tsuruga, Japan

[73] Assignee: Yugen Kaisha Go Chuzo Tekko Sho, Fukui, Japan

[21] Appl. No.: 417,940

[22] Filed: Sep. 14, 1982

[30] Foreign Application Priority Data

Sep. 18, 1981 [JP] Japan ................................ 56-148380

[51] Int. Cl.³ .............................................. G21C 19/20
[52] U.S. Cl. .................................... 376/261; 376/263; 376/271
[58] Field of Search ................ 376/261, 263, 264, 271

[56] References Cited

U.S. PATENT DOCUMENTS

| | | | |
|---|---|---|---|
| 3,340,154 | 9/1967 | Sinclair | 376/261 |
| 3,775,246 | 11/1973 | Frish et al. | 376/263 |
| 3,904,048 | 9/1975 | Van Santen et al. | 376/271 |
| 3,990,591 | 11/1976 | Street et al. | 376/271 |
| 4,053,356 | 10/1977 | Brammer, Jr. | 376/263 |

Primary Examiner—Sal Cangialosi
Attorney, Agent, or Firm—Edwin E. Greigg

[57] ABSTRACT

The invention provides an automatic channel box fitting position adjusting apparatus to facilitate positional adjustment of a channel box for fitting onto a nuclear fuel assembly. The apparatus comprises a position adjusting mechanism and a jig having a rod for controlling the position adjusting mechanism. The position adjusting mechanism includes guide rollers to guide the channel box to a correct fitting position. The guide rollers are tapered toward outer ends and are cantilevered at inner ends thereof.

4 Claims, 8 Drawing Figures

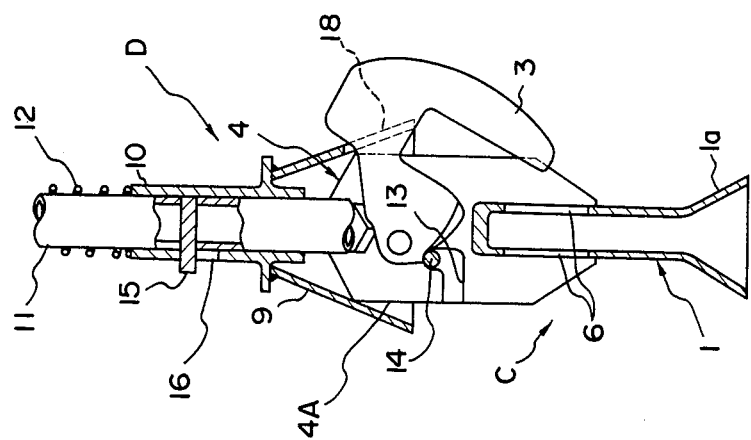
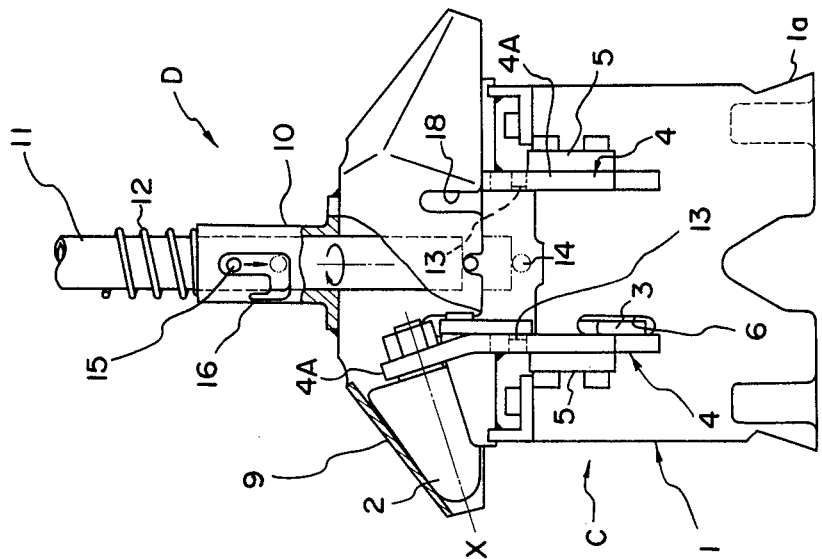
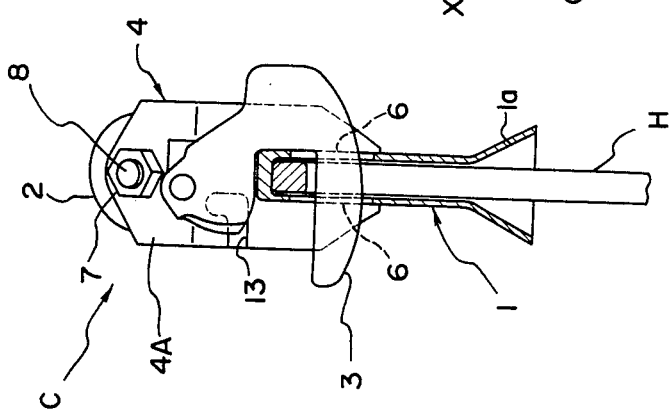

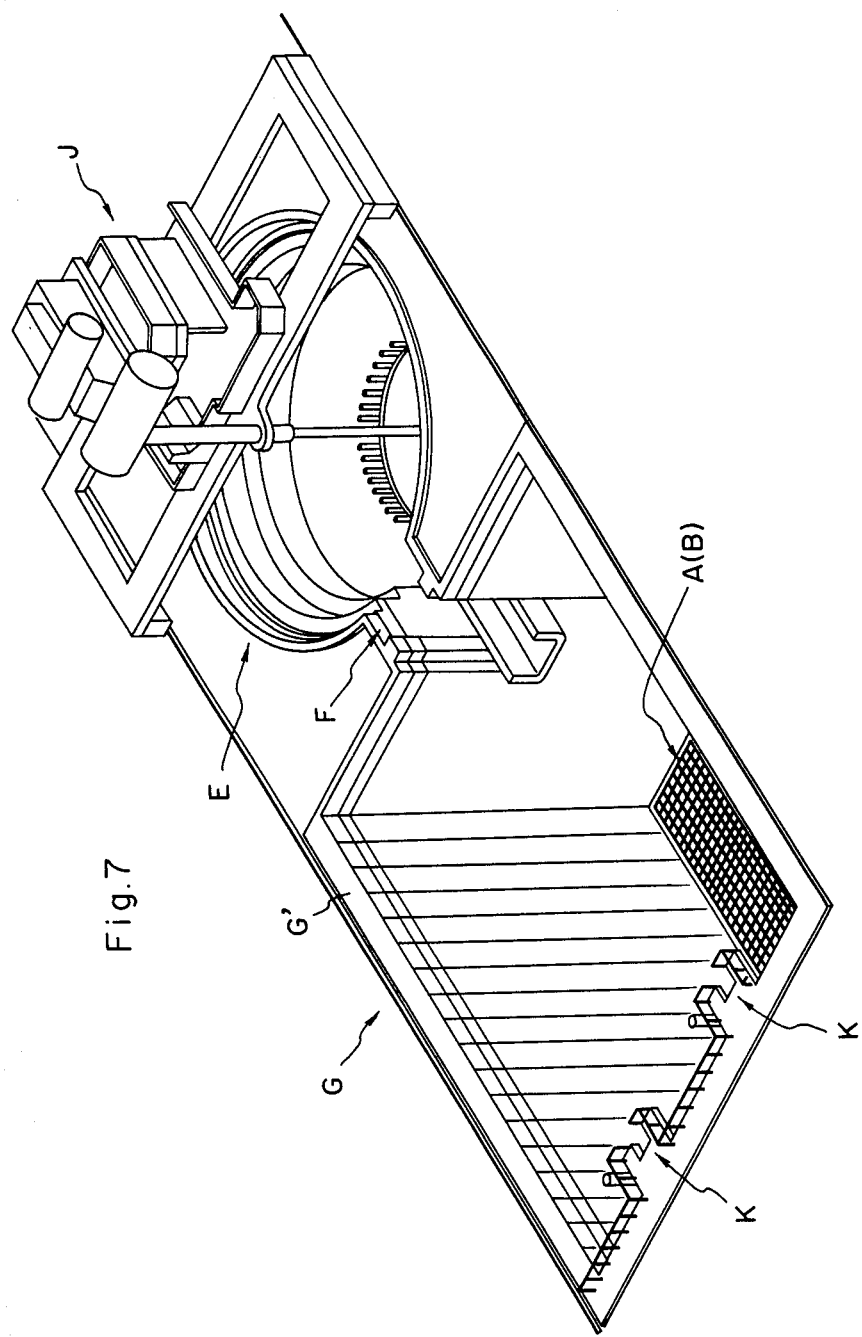

APPARATUS FOR AUTOMATICALLY ADJUSTING CHANNEL BOX FITTING POSITION RELATIVE TO NUCLEAR FUEL ASSEMBLY

BACKGROUND OF THE INVENTION

1. Field of the Invention

The present invention relates to an apparatus for automatically adjusting channel box fitting position for use in lowering and fitting a channel box in form of a square pipe onto a nuclear fuel assembly under water in a fuel reservoir. The nuclear fuel assembly is to be placed as heat source in a reactor vessel of a boiling water reactor (BWR) plant, and the channel box is fitted on the fuel assembly for promoting contact between the fuel assembly and precooling water.

2. Description of the Prior Art

In the BWR plant as shown in FIG. 7, the fuel reservoir G is in continuation with the reactor vessel E through a communicating passage F. Referring also to FIG. 1, the function of the reservoir G is to provide temporary storage for consumed or half consumed nuclear fuel assemblies A and their channel boxes, and the distance between a floor surrounding the reservoir and top surfaces of the fuel assemblies A deposited in the bottom of the reservoir is about eleven meters, the reservoir being filled with water up to 50 cm to one meter below the floor. Transfer of the fuel assemblies A (about 4 meters long) from the reactor vessel E to the reservoir G and mounting and dismounting of the channel boxes B (about 4 meters long) are all carried out under water, in depths of at least 1.5 meters. The underwater mounting and dismounting of the channel boxes B are conducted for the purpose of inspection of the fuel assemblies A taken out of the reactor vessel E to check on spacing among a plurality of pipy fuel rods contained in each fuel assembly, their deformation and so forth by using underwater television cameras. The fuel assembly A taken out of the reactor vessel E by a conveyer J is placed on an immersed elevator K provided on a side of the reservoir G. The elevator K is raised till the top of the fuel assembly A is about 1.5 meters below the water surface. Then a poolside operation is carried out to loosen a screw holding the channel box B to the fuel assembly A through one of gusset plates b at two top corners of the box B and to allow a hook shaped rod to catch the gusset plates b of the channel box B. The fuel assembly A comes off the channel box B downwardly as the elevator K is lowered. The channel box B is shelved onto an underwater rack provided beside the elevator, and the elevator is raised again to bring up the fuel assembly A to an appropriate height for inspection by the underwater television cameras.

After the inspection the channel box B is fitted back onto the fuel assembly A. This operation involves fitting of the channel box B about four meters long to the fuel assembly about four meters long in a depth of about ten meters below the water surface. In other words, the channel box B is fitted to the fuel assembly A lowered where its top is at least six meters deep. The channel box has cross sectional dimensions substantially corresponding to the 13×13 cm top surface of the fuel assembly A, and it is a very difficult operation to fit the channel box from above to the top of the fuel assembly at six meters below the water surface smoothly and with the respective four corners in concurrence.

In order to overcome the above noted difficulty, the present inventor developed his basic invention, namely an apparatus for automatically adjusting channel box fitting position as disclosed in a Japanese patent application laid open under No. 55-80094, whose principal part is shown in FIG. 8. This apparatus is capable of automatically adjusting the position of the channel box B' for fitting onto the top of the nuclear fuel assembly A' disposed at a depth of six meters below the water surface. The apparatus comprises a hanger cap 1' removably attachable to a hanger H' provided on an upper tie plate T1' of the nuclear fuel assembly A' and a pair of guide rollers 2' mounted on the hanger cap 1' rotatable on axes extending diagonally of the tie plate T1' when the hanger cap 1' is attached to the hanger H' in plan view and inclined downwardly toward outer ends thereof in side view. The guide rollers 2' are adapted to rotate by contact with bottom inner walls of the channel box B' to a correct position for fitting onto the fuel assembly A'.

In this apparatus the guide rollers 2' are shaped to flare along the axes of rotation toward the outer ends thereof and each of the guide rollers 2' is supported at two points by frames 4' extending from the hanger cap 1'. On the other hand, the channel box B' carries space regulator members or spacers 20' about 3.5×5×0.6 cm caulked by rivets 20 to two top outer corners thereof (see FIG. 1). When setting in the reactor vessel, the spacers 20' contact a position and space retainer grid (not shown: each grid accommodates four fuel assemblies) disposed in the reactor vessel, to avoid direct contact of the channel box B' with the grid. In the case of a fuel assembly giving big power output or a different type of fuel assembly, its channel box may have heads of the caulking rivets 20 projecting inside the corners of the channel box. Therefore, the prior art apparatus, which requires large occupying spaces in corners of the channel box B' because of the large outer ends of the guide rollers 2' and the presence of the frames for supporting the outer ends of the guide rollers, has a disadvantage of being applicable only to channel boxes having the space regulator members or spacers and caulking bolts away from the corners.

While the guide rollers 2' are inclined downwardly along the axes of rotation toward the outer ends thereof to provide desired downward guidance for the channel box B', the shape of the guide rollers 2' flaring toward the outer ends offers considerable resistance to the downward movement of the channel box B'. Therefore the prior art construction as described is unsatisfactory with regard to smooth guidance.

SUMMARY OF THE INVENTION

The object of the present invention is to provide an automatic channel box fitting position adjusting apparatus applicable to varied types of channel box and capable of smooth adjustment of channel box position.

The automatic channel box fitting position adjusting apparatus according to this invention comprises a position adjusting mechanism including a hanger cap removably attachable to the hanger through a hook clamp engageable with and disengageable from the hanger, and a pair of guide rollers having axes of rotation diagonal of the tie plate in plan view and inclined downwardly toward outer ends thereof in side view when the position adjusting mechanism is attached to the hanger thereby to be rotatable by contact with bottom inner walls of the channel box, and a jig including a rotatable and axially movable operating rod, a clamp pin secured to an extreme end of the rod, and a cover pivotable relative to the rod, for carrying the position adjusting mechanism and operating the hook clamp to engage with and disengage from the hanger, wherein the pair of guide rollers are shaped to taper along the axes of rotation toward outer ends thereof and are cantilevered at large diameter ends thereof by frames extending from the hanger cap.

The apparatus as described above requires minimum of occupying spaces in the corners of the channel box because the guide rollers have the smaller outer ends opposed to the corners of the channel box and because the roller supporting frames are not disposed at the outer ends of the rollers. Therefore one such apparatus is applicable to mounting and dismounting of plural types of channel box carrying the space regulator members or spacers at varied positions. Moreover, since the guide rollers grow larger toward the inner ends, bearings to rotatably support the guide rollers may be large and strong enough to withstand a load acting thereon at times of contact between the guide rollers and the channel box, such large bearings also being easy to assemble into the apparatus. In addition, since the guide rollers are cantilevered at a center of the channel box, material thickness and shape of the guide roller supporting frames are determined as desired while ensuring a sufficiently strong support and achieving simplicity of the supporting structure and easiness of assembly thereof.

Other objects and advantages of the present invention will be apparent from the following description.

BRIEF DESCRIPTION OF THE DRAWINGS

The drawings show an apparatus for automatically adjusting position of a channel box relative to a nuclear fuel assembly according to the present invention, in which:

FIG. 4 is a section taken on line IV—IV of FIG. 2,

FIGS. 5 and 6 are a partly broken away front view and a side view in vertical section, respectively, of the principal part as coupled to a jig, FIG. 7 is a schematic perspective view of a BWR plant.

DESCRIPTION OF THE PREFERRED EMBODIMENT

Figure 1:
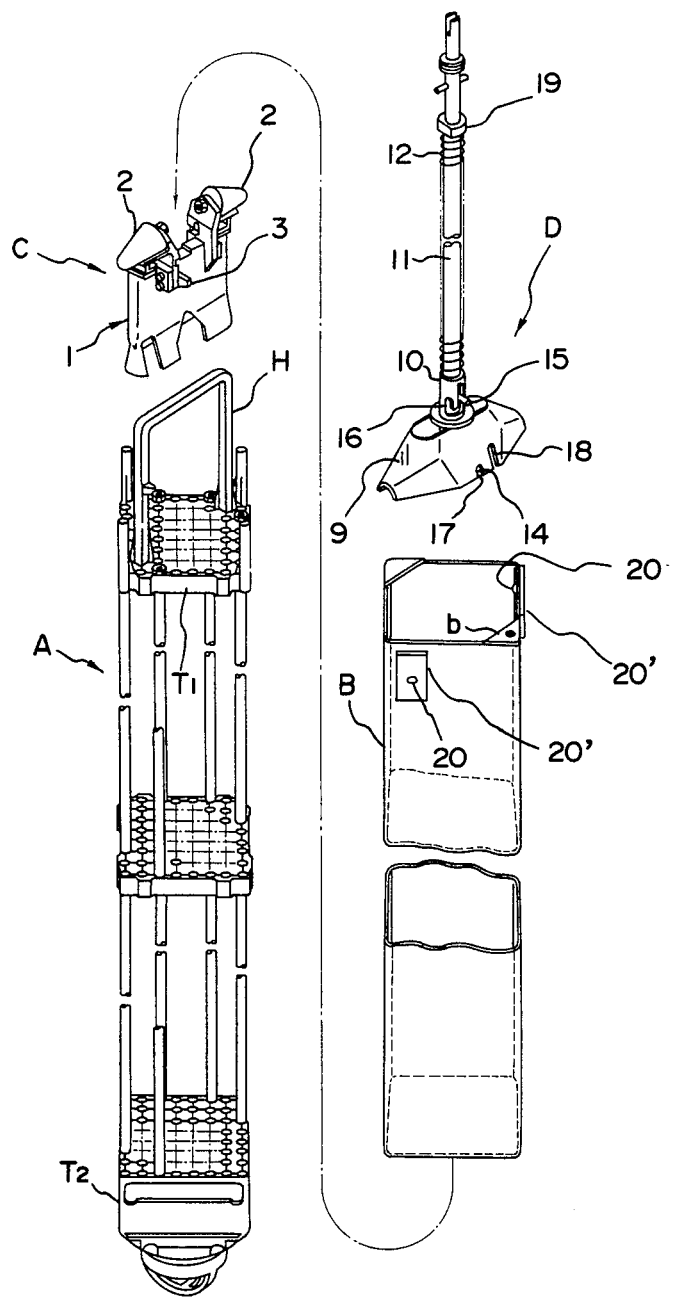
FIG. 1 is a developed perspective view of the apparatus.
Figure 2:
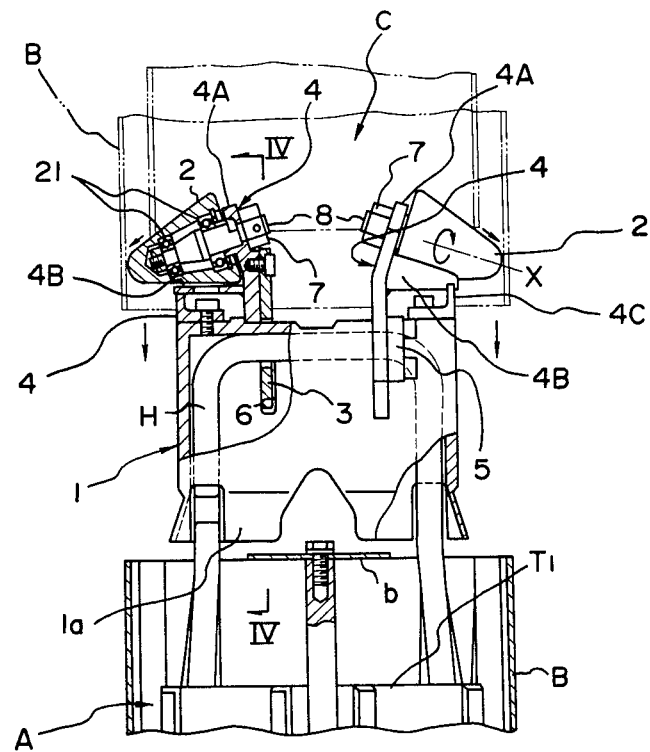
FIG. 2 is a partly broken away front view of a principal part of the apparatus.
Figure 3:
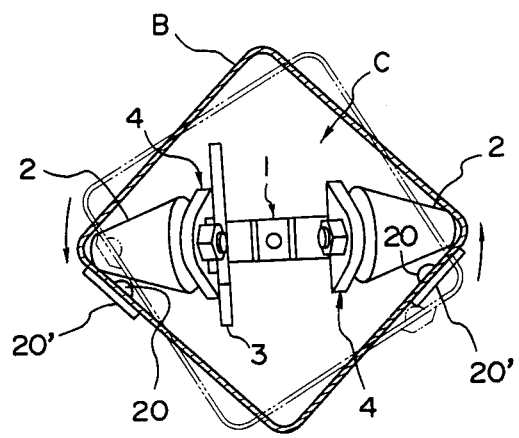
FIG. 3 is a plan view of the principal part of the apparatus.
Figure 8:
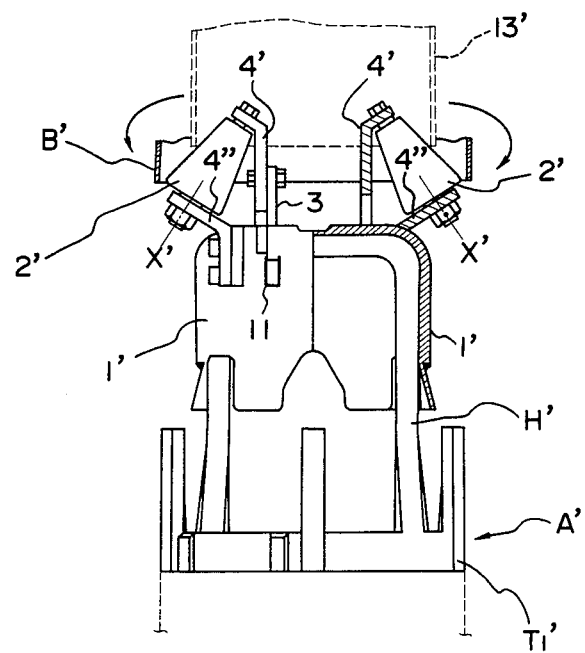
FIG. 8 is a partly broken away front view of a known position adjusting mechanism.

Referring to FIGS. 1 and 2, an automatic position adjusting mechanism C comprises a hanger cap 1 removably attachable to a hanger H provided on an upper tie plate T1 of a nuclear fuel assembly A and a pair of guide rollers 2 mounted on the hanger cap 1 rotatable by contact with bottom inner walls of a channel box B to automatically adjust position of the channel box B to be fitted to the fuel assembly A from top. A hook clamp 3 is provided between the guide rollers 2 to lock and unlock the hanger cap 1 with the hanger H as mounted on the latter. As seen, the guide rollers 2 are shaped to taper along axes of rotation toward outer ends thereof, and their axes of rotation extend diagonally of the tie plate T1 in plan view and incline downwardly toward outer ends when the automatic position adjusting mechanism C is in engagement with the hanger H. The guide rollers 2 are canitlevered at large ends thereof by a pair of frames 4 extending upwardly from the hanger cap 1, respectively.

Although shown only in framing in the drawings, the fuel assembly A (about 300 kg) is no different from conventional fuel assemblies used in BWRs, and comprises a plurality (normally 64) of pipy fuel rods filled with radioactive substance ($UO_2$ pellets) and assembled into a rectangular parallelepiped (about 4 meters long and about $13 \times 13$ cm in cross section) extending between upper and lower tie plates T1 and T2 interconnected by tie rods. The hanger H projects from and extends diagonally of the top surface of the upper tie plate T1. The channel box B also has the same construction as conventional channel boxes (about 4 meters long and 37 kg by weight). When fitted to the fuel assembly A, the channel box B is elastically supported at a bottom thereof by the lower tie plate T2 and bolted at a top thereof to the upper tile plate T1 through a gusset plate b secured to a top corner. Furthermore, spacers or space regulator members 20′ (about $3.5 \times 5 \times 0.6$ cm) are caulked by rivets 20 to the channel box B such that one end thereof projects inwardly of the box B in order to maintain appropriate spacing between the box and a control rod.

The hanger cap 1 has a bell shaped lower end 1a to facilitate proper mounting thereof onto the hanger H of the fuel assembly A, and U-shaped brackets 5 secured to either sides of the top thereof for carrying the frames 4, respectively. The hanger cap 1 is perforated as at 6 adjacent one of the brackets 5 to receive the hook clamp 3.

Each of the frames 4 comprises a vertical frame portion 4A bolted to the bracket 5, an arc frame portion 4B integral with the vertical frame portion 4A and extending therefrom to cover a lower portion of the large diameter part of the guide roller 2, and an L-shaped frame portion 4C secured to an extreme end of the arc frame portion 4B and bolted to the top of the hanger cap 1. The vertical frame portion 4A supports an axis 7 at a top end thereof by means of a nut 8 so as to permit no rotation of the axis 7, the axis 7 rotatably supporting the guide roller 2 by means of a right and left pair of bearings 21.

The extreme ends of the two guide rollers 2 have a distance therebetween only slightly less than a diagonal inside dimension of the channel box B. Thus the extreme ends of the guide rollers 2 are allowed a maximum approach to diagonal inside faces of the channel box B in order to guide the box B into smooth fitting, with a minimum of clattering, onto the fuel assembly A. The guide rollers 2 are adapted to allow the channel box B to turn round into a fitting position by contact of radial parts at extreme end portions thereof with corner inner walls of the channel box B. Compared for example with stationary rollers guiding the channel box B into the fitting position, the above arrangement has advantages of not only providing a smooth giding action but effectively protecting the guide rollers 2 from wear.

The hook clamp 3 is pivotable relative to the hanger cap 1 between an engaging position in which the hook clamp 3 penetrates the perforations 6 of the hanger cap 1 and a free position away from the perforations 6. The hook clamp 3 is biased and stably maintained in the engaging position contacting the hanger cap 1 by utilizing gravity.

The position adjusting mechanism C having the described construction is used in combination with a jig D for facilitating remote control from a pool side to bring the position adjusting mechanism C into and out of engagement with the hanger H of the nuclear fuel assembly A which is placed in an under position (about 11 m under the surface in a fuel reservoir for example). The jig D is constructed as follows.

A funnel shaped cover 9 to snugly fit onto the guide rollers 2 has a tubular member 10 secured to a center top position thereof to rotatably receive a vertically slidable operator rod 11 upwardly biased by a compression spring 12. A clamp pin 14 is secured to a lower end of the operator rod 11. When the operator rod 11 is moved downwardly against the biasing force of the spring 12 and then turned round, the clamp pin 14 switches the hook clamp 3 from the engaging position to the free position and at the same time couples the position adjusting mechanism C to the jig D by both ends of the clamp pin 14 entering L-shaped engaging recesses 13 defined in the vertical frame portions 4A and utilizing the biasing force of the compression spring 12 while retaining the hook clamp 3 in the free position. The tubular member 10 defines a substantially J-shaped guide groove 16 to receive a pin 15 screwed to the operator rod 11 and guide the operator rod 11 from an inoperative position to a release operating position. The cover 9 defines engaging recesses 17 to receive both ends of the clamp pin 14 respectively when the operator rod 11 is brought into the inoperative position, and a receiving recess 18 to allow the hook clamp 3 to pivot to the free position.

A stopper element 19 to bear an upper end of the compression spring 12 is attached to the operator rod 11 to be slidable and lockable axially thereof for positional adjustment.

The channel box fitting operation using the position adjusting mechanism C and the jig D according to the invention is described hereinafter. This operation takes place underwater within the nuclear fuel reservoir G, and the description of its process is already made under the Background of the Invention and is not repeated.

The cover 9 of the jig D is first placed on the guide rollers 2 of the position adjusting mechanism C, and the operator rod 11 as pressed downwardly is turned round clockwise to cause the clamp pin 14 to enter the L-shaped engaging recesses 13. When released from the downward pressure, the operator rod 11 moves upwardly by the biasing force of the compression spring 12 causing the clamp pin 14 to proceed to and rest in depths of the L-shaped recesses 13 thereby coupling the position adjusting mechanism C and the jig D. The mechanism C is lowered in this state to allow the hanger cap 1 to cover the hanger H of the fuel assembly A.

When the hanger cap 1 is in position to completely fit onto the hanger H, the operator rod 11 of the jig D is operated to bring the clamp pin 14 out of the L-shaped engaging recesses 13 thereby uncoupling the position adjusting mechanism C and the jig D. At this time the hook clamp 3 gravitationally pivots back to the engaging position whereby the hanger cap 1 is held onto the hanger H of the fuel assembly A in a stable manner.

Next, the channel box B is lowered to a position immediately above the fuel assembly A carrying the position adjusting mechanism C, the lowering operation being conducted by using a known remote control unit (not shown) attached to a gusset plate b of the channel box B. At this time, the channel box B only rarely is lowered to a correct fitting position relative to the fuel assembly A, slight errors occurring usually.

Therefore, the channel box B lowered with such a slight error comes into contact with the guide rollers 2 as sideways displaced relative to ridges of the guide rollers 2 (in front view) or a vertical plane including the rotational axes thereof. Then the guide rollers 2 rotate under the load of the channel box B and, since the guide rollers 2 are inclined downwardly toward the outer ends thereof, the channel box B slides down, while turning round, for a minimum resistance to its descent thereby to be automatically adjusted to the correct position to fit onto the nuclear fuel assembly A.

After the channel box B is completely fitted onto the fuel assembly, the jig D is lowered again, the cover 9 is placed on the guide rollers 2, and the clamp pin 14 is placed into the engaging recesses 13. The position adjusting mechanism C and the jig D as thus coupled are lifted whereby the position adjusting mechanism C departs from the fuel assembly A to be collected.

In order that the jig D is actuated to cause the position adjusting mechanism C to engage with and disengage from the hanger H of the fuel assembly A disposed about 11 meters below the water surface, an extension pole is removably connected to an upper end of the operator rod 11 of the jig D for the purpose of remote control.

I claim:

1. An automatic channel box fitting position adjusting apparatus for fitting a channel box (B) in form of square pipe to a nuclear fuel assembly (A) substantially in form of a rectangular parallelepiped and having an inverted U-shaped hanger (H) diagonally of an upper tie plate (T1) thereof, said apparatus comprising;
   a position adjusting mechanism (C) including a hanger cap (1) removably attachable to said hanger (H) through a hook clamp (3) engageable with and disengageable from said hanger (H), and a pair of guide rollers (2) having axes of rotation (X) diagonal of said tie plate (T1) in plan view and inclined downwardly toward outer ends thereof in side view when said position adjusting mechanism (C) is attached to said hanger (H) thereby to be rotatable by contact with bottom inner walls of said channel box (B), and
   a jig (D) including a rotatable and axially movable operating rod (11), a clamp pin (14) secured to an extreme end of said rod (11), and a cover (9) pivotable relative to said rod (11), for carrying said position adjusting mechanism (C) and operating said hook clamp (3) to engage with and disengage from said hanger (H),
   wherein said pair of guide rollers (2) are shaped to taper along the axes of rotation (X) toward outer ends thereof and are cantilevered at large diameter ends thereof by frames (4) extending from said hanger cap (1).

2. An automatic channel box fitting position adjusting apparatus as defined in claim 1 wherein said guide rollers (2) are rotatably supported by said frames (4) secured to said hanger cap (1), and said hook clamp (3) is pivoted to one of said frames (4).

3. An automatic channel box fitting position adjusting apparatus as defined in claim 2 wherein said hanger cap (1) has a bell shaped lower end.

4. An automatic channel box fitting position adjusting apparatus as defined in claim 2 or 3 wherein said hook clamp (3) is engageable with said hanger (H) by gravity.

* * * * *